United States Patent
Iyer et al.

(10) Patent No.: US 8,704,679 B2
(45) Date of Patent: Apr. 22, 2014

(54) FRAMEWORK FOR PACKET PROCESSING FOR SECURE V2V APPLICATIONS ON RESOURCE-CONSTRAINED PLATFORMS

(75) Inventors: Aravind V. Iyer, Bangalore (IN); Aditya R Karnik, Bangalore (IN); Bhargav R. Bellur, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 13/534,348

(22) Filed: Jun. 27, 2012

(65) Prior Publication Data

US 2014/0002276 A1 Jan. 2, 2014

(51) Int. Cl.
*G08G 1/00* (2006.01)
(52) U.S. Cl.
USPC ............ 340/901; 340/903; 340/933; 340/436
(58) Field of Classification Search
USPC ................. 340/901, 902, 903, 905, 933, 935, 340/425.5, 435, 436, 438; 701/301
See application file for complete search history.

(56) References Cited

U.S. PATENT DOCUMENTS

| | | | | |
|---|---|---|---|---|
| 6,445,308 B1 * | 9/2002 | Koike | | 340/902 |
| 7,183,932 B2 * | 2/2007 | Bauer | | 340/575 |
| 8,169,338 B2 * | 5/2012 | Mudalige | | 340/901 |
| 8,229,663 B2 * | 7/2012 | Zeng et al. | | 701/301 |
| 8,373,577 B2 * | 2/2013 | Ieda et al. | | 340/902 |

* cited by examiner

*Primary Examiner* — Toan N Pham

(57) ABSTRACT

A packet processing framework is provided for a vehicle-to-vehicle communication packet processing system. The framework includes a neighborhood vehicle tracking module for tracking neighboring vehicles relative to a host vehicle. The neighborhood vehicle tracking module assigns a priority level of neighboring vehicles relative to a host vehicle. An adaptive security processing module regulates messages streamed to the neighboring vehicle tracker module that are in accordance with the priorities set forth by the neighborhood vehicle tracking module. The adaptive security processing module selects security modes and schedules messages streamed to the neighborhood vehicle tracking module as a function of priorities set forth by the neighborhood vehicle tracking module, a communication reliability of the transmitting neighboring vehicle, and a likelihood that a message from the neighboring vehicle is genuine as determined by the adaptive security processing module. The neighborhood vehicle tracking module outputs processed kinematics and alert information to at least one vehicle-to-vehicle application.

20 Claims, 3 Drawing Sheets

FRAMEWORK FOR PACKET PROCESSING FOR SECURE V2V APPLICATIONS ON RESOURCE-CONSTRAINED PLATFORMS

BACKGROUND OF INVENTION

An embodiment relates generally to vehicle-to-vehicle communications.

In vehicle-to-vehicle communications (V2V), vehicles are equipped with wireless radio interfaces which they use to communicate with one another. An objective of a V2V network is to enable driver assistance safety applications such as emergency electronic brake light (EEBL) or blind spot warning (BSW) applications. V2V safety applications rely on wireless communications for exchanging useful information that pertain to driving conditions. Exchanged information relied upon includes kinematical information (e.g., the motion of objects without consideration of the forces producing the motion such as mass and force), road condition information, and even traffic information. The information is processed to determine whether warnings or advisories should be conveyed to the driver of the vehicle to enable the driver to make appropriate driving maneuvers. Drivers are expected to make use of the warnings/advisories and act upon such warnings/advisories received from the V2V system, in a similar manner as reacting to turn signals or brake lights of cars ahead of them, or warning signals displayed on a side of the road. As a result, it is imperative to ensure the integrity/correctness of the information exchanged and provided to the driver by the V2V system.

The traditional network security approach to verify the transmitted information is to append signatures or authentication tags to each message that is exchanged using V2V wireless communications, and use only those messages to generate alerts whose signature or authentication tag is verified to be valid. While this approach can ensure the authenticity of the information that V2V safety applications act upon, it leaves open the issue of how a vehicle is expected to authenticate and process messages given its limited computational resources.

In contrast to workstation computer systems or notebook computers which are computationally capable and have large storage capabilities, automotive computing platforms are commonly equipped with limited computational and storage capabilities. These limited computational and storage resources need to be allocated to messages in accordance with their urgency. Current approaches used in vehicles that include first-in first-out fail to appreciate the urgency of the data being authenticated. Other approaches such as assigning deadlines to messages or demanding verification of specific messages, may lead to improvement in performance, but it is not clear whether the assigned deadlines or the requested verifications are feasible. These approaches may lead to exploitation by attackers crafting bogus messages that would attract urgent deadlines.

Given a vehicle with a limited amount of computational resources, a vehicle may not be able to track all the vehicles from which it receives messages with equally high accuracy. The processing strategies and the security layer need to work with the limited amount of storage and computational capability that is available. Secondly, with respect to neighboring vehicles, it may be necessary to assign them priorities based on their relative impact on the host vehicle. Further, vehicles and the communication network within a V2V communication system are resource limited as the communication network typically has a limited bandwidth. Therefore, processing strategies and the security layer need to be sensitive to the availability or lack of information from respective sending vehicles. Lastly, the processing strategy and security layer need to be resilient to computational Denial-of-Service (DoS) attacks whereby its resources may be overwhelmed by processing bogus packets.

SUMMARY OF INVENTION

An advantage of an embodiment described herein is the vehicle tracking module interfacing between an adaptive security processing module and the V2V applications which provides a basic tracking guarantee and a central interface for V2V applications to interact with the adaptive security processing module. As a result, a vehicle tracking module assesses the relative importance of neighboring vehicles which enables the adaptive security processing module to decide how to best allocate its limited computational resources. The adaptive security processing module cooperatively takes into account vehicle priorities communicated by the vehicle tracking module, the communication reliability as determined by communication layers of the receiver, and the beliefs of the neighboring vehicles which the adaptive security processing module itself determines.

An embodiment contemplates a packet processing framework for a vehicle-to-vehicle communication packet processing system where processed packets are selectively provided to vehicle-to-vehicle applications. The framework includes a neighborhood vehicle tracking module for tracking neighboring vehicles relative to a host vehicle. The neighborhood vehicle tracking module assigns a priority level of neighboring vehicles relative to a host vehicle. An adaptive security processing module regulates messages streamed to the neighborhood vehicle tracking module that are in accordance with the priorities set forth by the neighborhood vehicle tracking module. The adaptive security processing module selects security modes and schedules messages streamed to the neighborhood vehicle tracking module as a function of priorities set forth by the neighborhood vehicle tracking module, as a function of the communication reliability of the transmitting neighboring vehicle, and as function of the likelihood that a message from the neighboring vehicle is genuine as determined by the adaptive security processing module. The neighborhood vehicle tracking module outputs processed kinematics and alert information to at least one vehicle-to-vehicle application.

DETAILED DESCRIPTION

Figure 1:
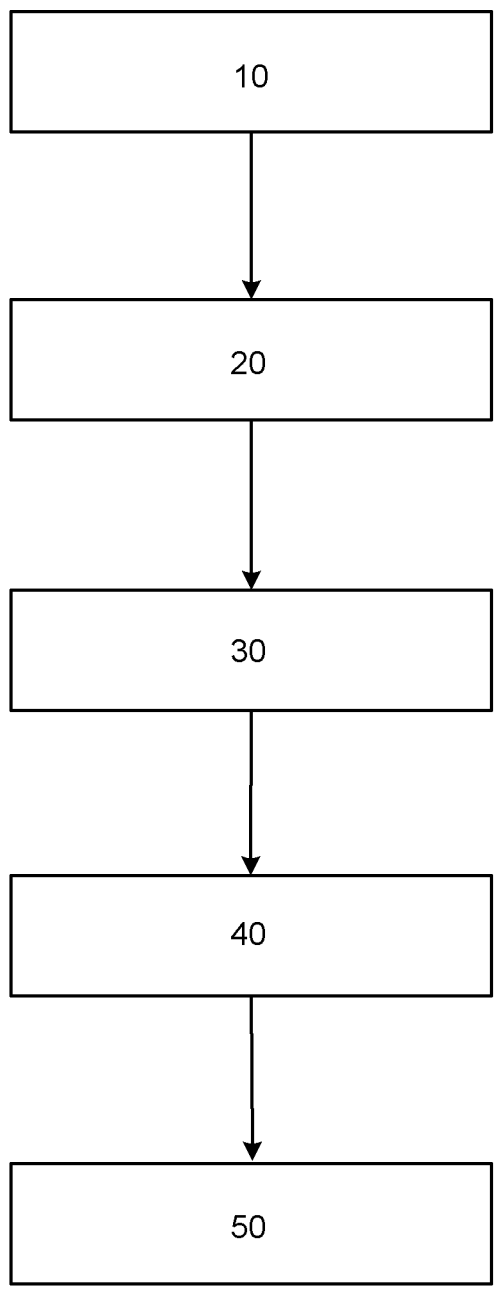
FIG. 1 is a high level block diagram of packet processing modules for a vehicle-to-vehicle communication system.

There is shown in FIG. 1 a block diagram of packet processing modules for secure vehicle-to-vehicle (V2V) communications. A communication module 10 provides addressing and channel control mechanisms that allow communication within a multi-point network. The communication module 10 focuses on streamlining and selecting messages received on the communication interface for further processing (e.g., as per the DSRC (Dedicated Short-Range Communications) standard). The decision as to whether received messages are forwarded for security processing from the communication module 10 is not discussed in detail herein and can the process be performed by any known means (e.g., DSRC).

After received messages are forwarded from the communication module 10 for security processing, an adaptive security processing module 20 determines how various functionalities associated with security processing can be performed. Specifically, the adaptive security processing module 20 makes the decision as to which message should be analyzed for security scheduling that would result in those critical neighborhood vehicle messages becoming available first.

A neighborhood vehicle tracking module 30 tracks neighboring vehicles with appropriate accuracy and provides neighborhood vehicle kinematics data and alerts via a neighborhood kinematics and alerts module 40 to V2V applications 50. The neighborhood vehicle tracking module 30 exercises intelligence in tracking vehicles. The neighborhood vehicle tracking module 30 assigns different priority levels to different vehicles and track vehicles only to a level of accuracy merited by their respective corresponding priority level. The neighborhood vehicle tracking module 30 also provides feedback to the adaptive security processing module 20 so that the appropriate authenticated messages are fed into the neighborhood vehicle tracking module 30 by the adaptive security processing module 20.

The processing decisions set forth by the adaptive security processing module 20 need to be based on (i) the neighboring priorities as dictated by the neighborhood vehicle tracking module 30; (ii) the communication reliability of receiving messages from particular neighboring vehicles maintained by the communication module 10; and (iii) the belief of the adaptive security processing module 20 about a potential of success of the verification process. Such decisions need to be executed by balancing all authentication options of all packets from each different cryptographic credential. Therefore, packets emanating from each different cryptographic credential are treated as distinct packet streams to select which respective packet should be analyzed by a security scheduler that would result in the most critical neighborhood information becoming available.

The V2V applications 50 acquire the information from the neighborhood vehicle tracking module 30 and infer specific hypotheses. The hypotheses inferred by the V2V applications 50 that have sufficient confidence or sufficient urgency due to the consequences may then be further processed and raised to awareness to a driver of the vehicle through a human machine interface of the respective V2V application 50. An example of a V2V application that utilizes the information provided by the neighborhood vehicle tracking module 30 may include an Emergency Electronic Brake Light (EEBL) application whereby a vehicle that is braking hard transmits a wireless V2V message to concerning the hard braking action. Another example of a V2V application is a Blind Spot Warning (BSW) application, which continually tracks the trajectories of vehicles around a host vehicle and alerts a driver if there is a vehicle in one of its blind spots.

Figure 2:
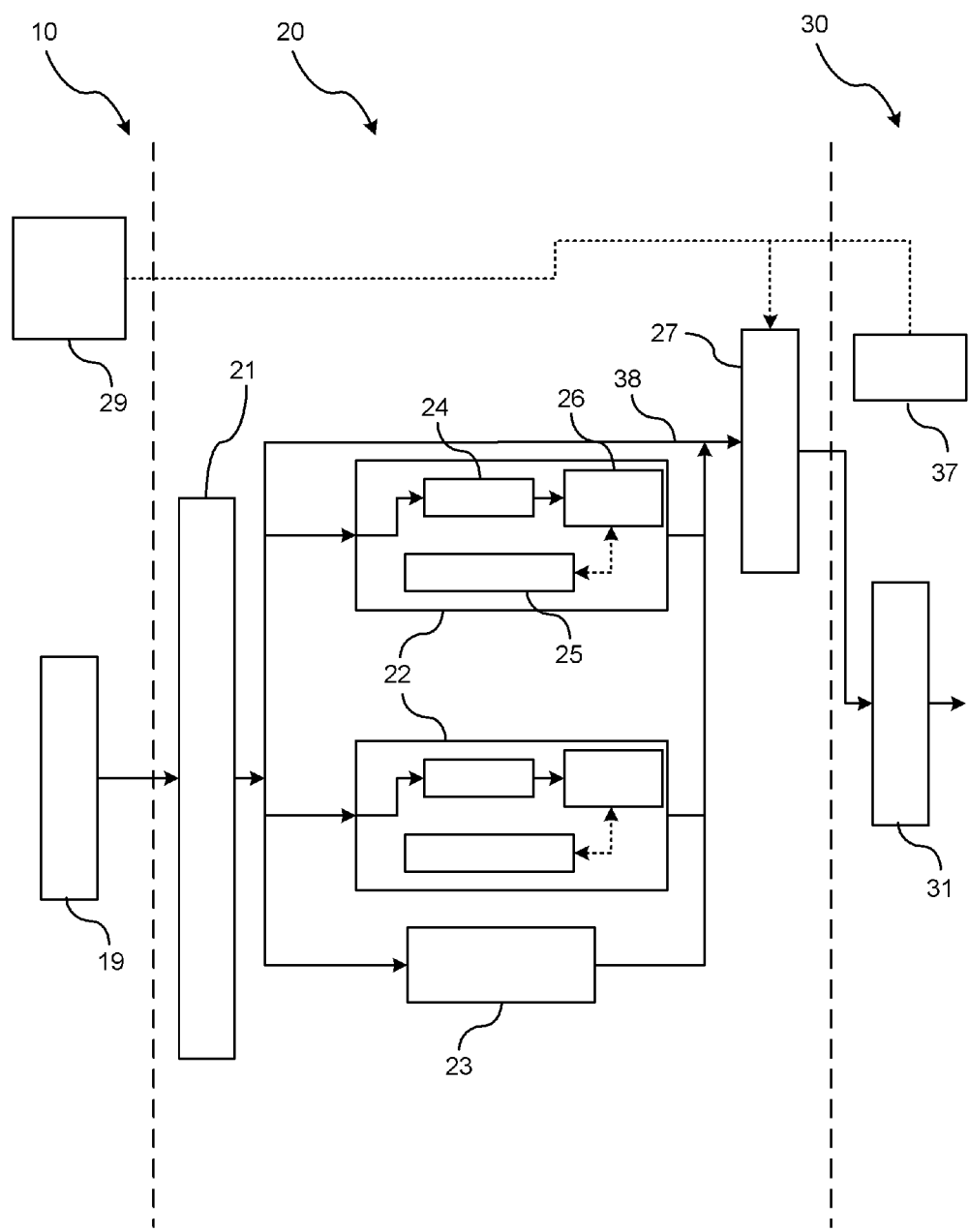
FIG. 2 is a block diagram of an adaptive security processing module.

FIG. 2 is a block diagram of the adaptive security processing module 20. It should be understood that the solid lines shown in FIG. 2 represent an exchange of V2V communication data and/or processing of V2V communication data, whereas the dotted lines represent an exchange of control information. The adaptive security processing module 20 includes a received message classifier 21 for receiving incoming messages 19 from the communication module 10. The incoming received messages are classified based on their respective cryptographic credentials. The cryptographic credentials may include, but is not limited to, a digital certificate, credential key, an anonymous digital certificate, or a pseudonym.

A plurality of identifier blocks 22 are each assigned to a respective identifier. That is, if an incoming message originates from an identifier that there has been a previous encounter with, then the incoming message is assigned to that respective identifier block. If an incoming message originates from an identifier that there has been no encounter with, then a new entry, such as that shown generally at block 23, is created for storing and keeping track of message from that identifier.

Each of the identifier blocks includes a buffer 24, a belief manager 25, and a mode selector 26. The buffer 24 is used to store all messages received by the sender associated with the respective identifier. The belief manager 25 determines a confidence factor about a success of the verification operation. The confidence factor is utilized by the mode selector 26 in cooperation with other factors for determining how messages within the respective identifier buffer 24 should be prioritized for verification. In addition, the mode selector 26, determines which authentication mode should be used for verification. Various broadcast authentication schemes or authentication modes offer various options to process packets. An authentication mode or simply 'mode' is a way in which a message can be verified. For instance, if a message has two authentication tags associated with two broadcast authentication schemes, then verification of either one is a different mode. Even if a message has only one authentication tag, verifying it or discarding it can be considered two different modes. With specialized broadcast authentication schemes, there are tradeoffs with respect to delayed authentication or authentication of imprecise information in return for lower resource consumption. In such cases, a receiving vehicle may tolerate delayed or imprecise information of a lower priority sender but may insist on immediate and precise information about higher priority senders. Examples of broadcast authentication schemes that may be used includes, but is not limited to, ECDSA, TADS, and Winternitz one-time signature scheme.

A security processing scheduler 27 determines which identifier should be selected for verifying the messages queued for verification. The decision of the security processing scheduler 27 is with respect to an entire domain of choices of all authentication options of all packets from all streamed messages. The security processing scheduler 27 makes this decision based upon various criteria that include the decisions of the mode selection blocks within each identifier, priorities assigned by a neighbor priority block (i.e., from the neighborhood vehicle tracking module 30), packet reception reliability estimated by a neighborhood packet reliability estimator 29 (i.e., from the communications module 10), the belief relating the success of the verification operation as estimated by the plurality of belief managers 25.

After the verification operation, the appropriate belief manager is updated. The decision of the security processing scheduler 27 selectively streams messages to the neighborhood vehicle tracking module 30.

The neighborhood vehicle tracking module 30 utilizes (i) a neighboring priority sub-module by which the neighborhood vehicle tracking module assigns different priority levels to different vehicles based upon their importance for inferring hypotheses about dangerous driving situations involving the host vehicle; and (ii) neighborhood kinematics and alerts module in which the neighborhood vehicle tracking module maintains neighborhood kinematical data to a level of accuracy merited by a corresponding priority assignment. As a result, the neighborhood vehicle tracking module 30 avoids the difficulty of trying to access all received messages with equal accuracy. Rather the neighborhood vehicle tracking module 30 takes into consideration that all vehicles do not need to be tracked with equal accuracy as messages from vehicles that may be closer, faster and of greater importance may require greater analysis for inferring hypotheses about potential collision or dangerous situations pertaining to the host vehicle.

Figure 3:
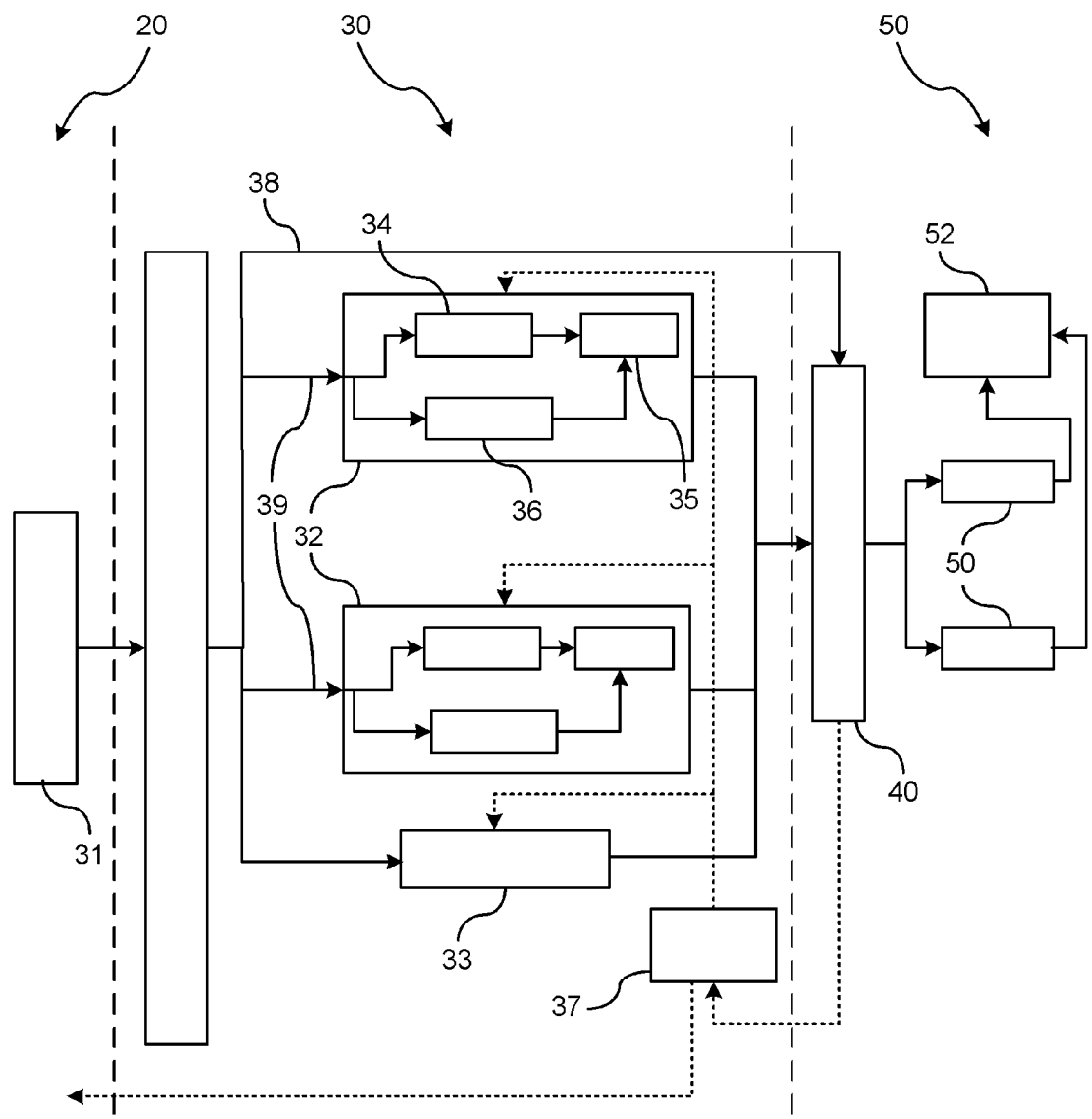
FIG. 3 is a block diagram of a neighborhood vehicle tracking module.

FIG. 3 is a block diagram of the neighborhood vehicle tracking module 30. It should be understood that the solid lines shown in FIG. 3 represent an exchange of V2V communication data and/or processing of V2V communication data, whereas the dotted lines represent an exchange of control information. Authenticated messages 31 being passed on from the adaptive security processing module 20 to the neighborhood vehicle tracking module 30 are first classified into alerts 38 and beacons 39. Beacons 39 are kinematical status updates that are broadcast repeatedly by all vehicles in a V2V communication system. Alerts 38 are messages which provide a warning about a specific event such as hard braking or a road condition (e.g., ice on the road). Alerts 38 are directly provided to a neighborhood kinematics and alerts module 40 which is responsible for ultimately interacting with the V2V applications so as to present all the information required to generate a hypothesis by a respective V2V application.

There is also shown in the neighborhood vehicle tracking module 30 a plurality of beacon sub-modules 32. Beacon sub-modules 32 are used to track kinematics of neighboring vehicles. Each beacon sub-module 32 corresponds to a vehicle being tracked. If an incoming beacon message originates from an identifier that there has been an encounter with, then the incoming beacon message is assigned to that respective beacon. If an incoming message originates from an identifier that the host vehicle has had no previous encounter, then a new beacon entry is generated, such as that shown generally at block 33, for storing and keeping track of beacon from the new identifier.

The contents of the beacon message provide the latest information pertaining to a neighboring vehicle being updated. The information is provided to an updater 34 which maintains the latest information relating to the content of the beacon message. If for some reason the latest information does not correspond to a current time stamp, then the current information is predicted via a predictor 35. Predicting the information is performed via an estimator sub-module 36. For example, let the current time be noon at the host vehicle A. At this point in time, the latest update from vehicle B is in vehicle A's V2V computer which is a packet that is time-stamped 11:45 AM. The delay in reception of this packet may be due to a variety of reasons. Such reasons include processing and queuing delays at vehicle B's computer; or delays in getting access to a wireless channel to transmit the packet; or processing and queuing delays at the security layer of vehicle A's computer. At noon (i.e., the current time), vehicle A would update both the kinematic parameters of vehicle B and the variables in the estimator block of vehicle B using the latest packet. An estimate of vehicle B's current kinematical status is obtained using the predictor. As a result, the updater 34 contains the latest known kinematical data, whereas the predictor 35 holds the current known or predicted kinematical data, and estimator 36 holds the parameters of the filtering engine which characterizes vehicle B's mobility and performs the prediction. Each of the beacon sub-modules 32 includes a respective estimator sub-module 36 whose parameters are continually updated by the incoming beacon messages. The last received and/or predicted information from a neighboring vehicle is processed by the neighborhood kinematics and alerts module 40.

A neighbor priority sub-module 37 analyzes the latest received or predicted information about each of the neighboring vehicles and updates the assignment of priority of each vehicle being tracked. The neighbor priority sub-module 37 also interacts with the adaptive security processing module 20 to influence the flow of messages into the neighborhood vehicle tracking module 30. The interaction between the neighbor priority sub-module 37 and the adaptive security processing module 20 establishes the priorities of the V2V application conveyed to adaptive security processing module 20. This mechanism is absent in simplistic approaches like first-in-first-out.

The neighborhood kinematics and alerts module 40 which communicates directly with the neighbor priority sub-module 37 provides a central interface for V2V applications 50 to interact with. The V2V applications 50 directly interface with a human machine interface (HMI) 52 for raising HMI alerts. These alerts may be displayed to the driver who may take actions based upon the content of the HMI alerts.

The neighborhood kinematics and alerts module 40 also interacts with the neighbor priority sub-module 37 to reassign priorities in accordance with application requirements. It should be noted in simple prior art modes of interaction, an individual application (e.g. EEBL or BSW) may directly ask the security layer that specific messages be verified and processed within a deadline. The advantage of the neighborhood vehicle tracking module 30 is the interfacing between the adaptive security processing module 20 and the V2V applications 50 which provides a basic tracking guarantee and a central interface for applications to interact with the adaptive security processing module 20. As a result, neighborhood vehicle tracking module 30 via the neighbor priority sub-module 37 influences the scheduling of the security processing by the adaptive security processing module 20.

While certain embodiments of the present invention have been described in detail, those familiar with the art to which this invention relates will recognize various alternative designs and embodiments for practicing the invention as defined by the following claims.

What is claimed is:

1. A packet processing framework for a vehicle-to-vehicle communication packet processing system wherein processed packets are selectively provided to vehicle-to-vehicle applications, the framework comprising:
 a neighborhood vehicle tracking module for tracking neighboring vehicles relative to a host vehicle, the neighborhood vehicle tracking module assigning a priority level of neighboring vehicles relative to the host vehicle;
 an adaptive security processing module for regulating messages streamed to the neighborhood vehicle tracker module that are in accordance with priorities set forth by the neighborhood vehicle tracking module; and
 wherein the adaptive security processing module selects authentication modes and schedules messages streamed to the neighborhood vehicle tracking module as a function of priorities set forth by the neighborhood vehicle tracking module, as a function of a communication reliability of a transmitting neighboring vehicle, and as a function of a likelihood that a message from the neighboring vehicle is genuine as determined by the adaptive security processing module, and wherein the neighborhood vehicle tracking module outputs processed kinematics and alert information to at least one vehicle-to-vehicle application.

2. The framework of claim 1 further comprising a neighboring kinematics and alerts module interacting between the neighborhood vehicle tracking module and the vehicle-to-vehicle applications, for selectively providing processed information relating to neighboring vehicles to vehicle-to-vehicle applications.

3. The framework of claim 2 wherein the neighboring kinematics and alerts module provides a central interface for vehicle-to-vehicle applications to interact with the adaptive security processing module.

4. The framework of claim 2 wherein the neighborhood vehicle tracking module maintains kinematical information relating to a level of accuracy merited by the assigned priority.

5. The framework of claim 2 wherein the neighborhood vehicle tracking module includes a plurality of beacon modules, wherein each beacon module tracks kinematics-related information for a specific neighboring vehicle.

6. The framework of claim 5 wherein each beacon module includes an estimator, wherein an estimator estimates kinematics information at a respective instance of time if information retrieved in a beacon message does not correspond to a current time stamp.

7. The framework of claim 5 wherein the neighborhood vehicle tracking module further comprises a neighbor priority sub-module, the neighbor priority sub-module interacts with the neighboring kinematics and alerts module for reassigning message priorities as a function of vehicle-to-vehicle communication application requirements.

8. The framework of claim 7 further comprises a security processing scheduler for assessing which allotment of messages are to be queued for verification, wherein the neighbor priority sub-module provides priority data of each neighboring vehicle being tracked to the security processing scheduler.

9. The framework of claim 8 wherein a neighbor packet reliability estimator sub-module provides communication reliability information to the security processing scheduler.

10. The framework of claim 1 further comprising a message classifier for classifying an incoming message to the neighborhood vehicle tracking module as one of a beacon or an alert, wherein the incoming message classified as an alert is directed to a neighborhood kinematics and alert module, and wherein the incoming message classified as a beacon is directed to one of a plurality of beacon modules.

11. The framework of claim 1 further comprising a human machine interface for interacting with at least one vehicle-to-vehicle communication application for outputting an alert to a driver of a vehicle.

12. The framework of claim 1 wherein the neighborhood vehicle tracking module includes a new beacon entry generator for generating an new beacon sub-module for a respective beacon message in response to a beacon message originating from a vehicle not previously encountered.

13. The framework of claim 1 wherein the adaptive security processing module includes a plurality of identifiers, wherein a message from a respective neighboring vehicle is stored in a respective identifier.

14. The framework of claim 13 wherein each identifier includes a buffer for storing received messages.

15. The framework of claim 14 wherein each identifier includes a belief manager for providing a confidence factor indicating how messages stored in the buffer are to be prioritized for verification.

16. The framework of claim 15 wherein each identifier includes a mode selector interacting within the buffer and the belief manager, the mode selector selecting which messages in the buffer to verify.

17. The framework of claim 16 wherein the mode selector selects an authentication mode for authenticating the selected message.

18. The framework of claim 13 wherein the adaptive security processing module further comprises a security processing scheduler, the security processing scheduler interacting with each of the identifiers for selectively prioritizing which identifier messages should be retrieved for verification.

19. The framework of claim 1 wherein the adaptive security processing module further comprises a classifier, wherein received messages from a receiver are classified for discarding based on cryptographic credentials of the message.

20. The framework of claim 1 wherein the neighborhood vehicle tracking module includes a new identifier generator for generating an identifier sub-module for a respective received message in response to a received message originating from a vehicle not previously encountered.

* * * * *